Nov. 10, 1959 J. W. WARING 2,912,656
CONSTANT BANDWIDTH COUPLING SYSTEM
Filed March 7, 1955 4 Sheets-Sheet 1

INVENTOR.
JOHN W. WARING
BY
ATTORNEY

Nov. 10, 1959 J. W. WARING 2,912,656
CONSTANT BANDWIDTH COUPLING SYSTEM
Filed March 7, 1955 4 Sheets-Sheet 2

INVENTOR.
JOHN W. WARING
BY
ATTORNEY

INVENTOR.
JOHN W. WARING
BY
ATTORNEY

Nov. 10, 1959   J. W. WARING   2,912,656
CONSTANT BANDWIDTH COUPLING SYSTEM
Filed March 7, 1955   4 Sheets-Sheet 4

INVENTOR.
JOHN W. WARING
BY
ATTORNEY

United States Patent Office 2,912,656
Patented Nov. 10, 1959

2,912,656

CONSTANT BANDWIDTH COUPLING SYSTEM

John W. Waring, Palmyra, N.J., assignor to Philco Corporation, Philadelphia, Pa., a corporation of Pennsylvania Application March 7, 1955, Serial No. 492,603

6 Claims. (Cl. 333—77)

This invention relates to interstage coupling systems, and more particularly to constant bandwidth interstage coupling systems for tunable stages.

Recent developments in the field of communications have pointed to the need for tunable selective amplifier circuits which will operate satisfactorily over a very wide tunable range. Particularly in the field of UHF television reception the need has arisen for multistage active preselector circuits having a passband of preselected width of say 10 megacycles which is positionable at will anywhere within the band between 470 and 890 megacycles. Selective circuits of this type generally employ a parallel tuned circuit or its equivalent in the output circuit of one stage, and a second parallel tuned circuit or its equivalent at the input of the following stage. These parallel tuned circuits are tuned in synchronism over the desired band, usually through the use of suitably ganged capacitors. Means must also be provided for coupling the output tuned circuit of one stage to the input tuned circuit of the following stage. Preferably the coupling means should be so constructed that no adjustments are required in the coupling circuit per se as the individual stages are tuned over the band. Other requirements are that the amplitude response of the entire interstage network, including the parallel tuned circuits, should be substantially constant over the major portion of the 10 megacycle passband, and that the amount of coupling from one stage to the next be a maximum consistent with the constant bandwidth and flat frequency response characteristic. Needless to say the coupling circuit should be as simple and inexpensive as possible.

It can be shown that two requirements must be met if the above conditions are to be satisfied. The first requirement is that the entire interstage network, including the two end circuits, must be such that the pole-zero diagram of the transfer impedance characteristic includes a pole at each of the —1 db points of the response characteristic, and such that the spacing between these poles remains constant as the end circuits are tuned over the desired frequency range. The second requirement is that the loading of the end circuits must vary as a function of frequency so that the entire interstage network remains critically loaded as the end circuits are tuned over the desired frequency range. These requirements are met in circuits embodying the present invention.

Various coupling circuits have been employed in the past with no real success. The simplest coupling means consists of two end circuits placed close together to provide mutual coupling between the inductive portions thereof. Such circuits are indeed simple but they may cause a more than two-to-one change in bandwidth for a two-to-one change in tuning frequency. In addition, straight mutual coupling of this type may cause undesirable changes in the shape of the passband. One variation of the straight mutual coupling between the two tuned circuits comprises placing an untuned inductive loop between the two tuned circuits so that there is mutual coupling between each tuned circuit and the loop, but no mutual coupling between the tuned circuits themselves. In some instances a similar coupling characteristic may be obtained by replacing the inductive loop with an inductor physically connected from a selected point on one tuned circuit to an appropriate point on the other tuned circuit. In general these circuits have coupling characteristics similar to the first mentioned coupling circuit and, for this reason, have the same disadvantages. Attempts have been made in the past to improve the operation of the straight inductive coupling circuits by adding a capacitor in series between the two tuned circuits. In theory the addition of such a capacitor will provide a marked improvement in the coupling characteristic, and this improvement is realized to a certain extent at the lower frequencies. However at higher frequencies, for example in the UHF band assigned to television systems, the equivalents of the parallel tuned circuits are made up of stray capacitance, lead inductance and other distributed factors. Furthermore, it is often necessary to provide range extension circuits, of the type hereinafter described, to achieve tuning over the desired two-to-one range. It has been found experimentally that, while the additional capacitive coupling between the two tuned circuits may be an improvement over straight inductive coupling, the bandwidth may still change by a factor of approximately two-to-one over a two-to-one change in frequency. In general the failure to maintain a constant bandwidth has resulted from a failure to maintain the proper pole spacing in the transfer impedance characteristic.

In addition to the difficulty encountered in maintaining a constant bandwidth over a two-to-one frequency range, generally it is very difficult to tune the parallel-tuned end circuit associated with vacuum tubes over a two-to-one frequency range in the UHF band. This difficulty arises from the fact that it is necessary to provide leads from the elements within vacuum tubes to external circuit elements. Tubes designed for operation at UHF frequencies have the elements arranged to reduce the lengths of these leads, but there is a lower limit of lead length below which it is not practical to go. These leads represent a certain amount of inductance which cannot be eliminated from the circuit. Leads and connections outside the tube add additional inductance and some stray capacitance. Usually this lead inductance forms the entire inductive component of the tuned end circuits. Generally the equivalent of a parallel tuned circuit is achieved at ultrahigh frequencies by providing a variable tuning capacitor in series with the lead inductance mentioned above. The tuning capacitor is adjusted so that the net inductive reactance of the lead inductance and the tuning capacitor is equal to the net capacitive reactance due to stray tube and wiring capacitance at the frequency to which the circuit is to be tuned. Obviously a large capacitance is required at the low frequency end of the tuning range, but a very small capacitance is required at the upper end of the tuning range. Generally it is impossible to obtain a variable capacitor, suitable for use in a television tuner or the like, which has the desired range of capacitance variation. The range extension circuit mentioned above is a novel arrangement for reducing the apparent minimum capacitance of the tuning capacitor without reducing to any great extent the maximum value of capacitance obtainable with the tuning capacitor.

Therefore it is an object of the present invention to provide a novel interstage coupling circuit which will give substantially constant bandwidth coupling between two tuned circuits over a wide frequency range.

A further object of the invention is to provide a novel constant bandwidth coupling circuit which is usable in the ultrahigh frequency range.

Another object of the invention is to provide a novel coupling network having a readily controllable pole spacing in its transfer impedance characteristic over at least a two-to-one frequency range.

Still another object of the invention is to provide a simple novel means for extending the tuning range of ultrahigh frequency circuits.

In general these and other objects of the invention are accomplished by providing a coupling network, between the tuned end circuits, which provides two signal paths, or their equivalent, between selected points on the two end circuits. One path includes only capacitance, and the second path includes both inductance and capacitance but appears as an inductive reactance over the tunable range. The second path is arranged to be series resonant at a frequency below the tunable range, and the two signal paths form the equivalent of a parallel circuit which is resonant at a frequency above the tunable range. The variation in the loading of the end circuits with frequency is accomplished through the proper selection of the inductive and capacitive reactances in the tuned end circuits.

For a better understanding of the invention reference should now be made to the following detailed description which is to be read in conjunction with the accompanying drawings in which.

Figure 1:
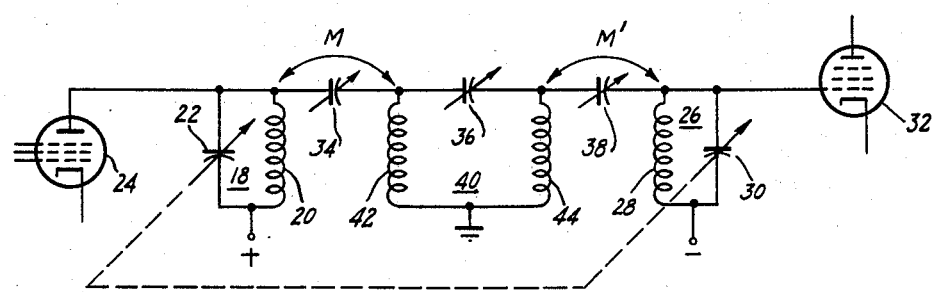
Fig. 1 is a schematic drawing of one preferred embodiment of the invention.

Turning now to the circuit of Fig. 1, a parallel resonant circuit 18, comprising inductor 20 and capacitor 22, forms the anode load for vacuum tube 24 and also one end circuit of the interstage coupling network. One common terminal of this parallel resonant circuit 18 is connected to a suitable source of anode supply potential represented by the plus sign (+) in Fig. 1. The other common terminal is connected to the anode of tube 24. A second parallel tuned circuit 26, comprising inductor 28 and capacitor 30, forms the input circuit of a second amplifier stage including vacuum tube 32, and the other end circuit of the interstage network. One common terminal of parallel circuit 26 is returned to a source of bias potential represented by the minus sign (—) in Fig. 1, while the other common terminal is connected to the control grid of tube 32. Capacitors 22 and 30 are ganged so that parallel circuits 18 and 26 are tuned in synchronism over a selected range of frequencies. The capacitive path between parallel tuned circuits 18 and 26 is provided by capacitors 34, 36 and 38. The second path comprises a tuned link 40 which is inductively coupled to inductors 20 and 28 respectively. More specifically inductor 42 of link 40 is inductively coupled to inductor 20, and inductor 44 of link 40 is inductively coupled to inductor 28. Inductors 42 and 44 and capacitor 36 form a circuit which is made resonant at a frequency below the tunable band.

While the circuit shown in Fig. 1 does not provide two separate physical paths between end circuits 18 and 26, it can be shown mathematically that the circuit of Fig. 1 provides the equivalent of two such paths. For the moment, however, attention will be concentrated on the practical aspects of adjusting the circuit of Fig. 1. As stated above, end circuits 18 and 26 are made tunable over a preselected frequency range. The mutual inductances M, between inductors 20 and 42, and M', between inductors 44 and 28, are adjusted to provide the desired coupling at approximately the mid-point of the tuning range. Usually this is accomplished by adjusting the physical position of one inductor with respect to the one to which it is mutually coupled. However, in some instances it may be more convenient to provide a core of a magnetic material which is so positioned as to affect the coupling between the mutually coupled inductors. Once the desired coupling is established at the mid-point of the tunable range, the end circuits 18 and 26 may be tuned to the lower end of the tunable range and capacitor 36 may be adjusted to set the bandwidth to the desired value for this setting of the tuned end circuits. Circuits 18 and 26 may then be tuned to the upper end of the tunable range, and capacitors 34 and 38 may be adjusted to set again the bandwidth of the coupling circuit at the value selected for the mid-frequency point. It has been found in practice that the adjustments at the two ends of the tunable range have very little effect on each other, and only a slight effect on the mid-frequency adjustment achieved by controlling the mutual coupling M and M'. Capacitors 34, 36 and 38 are shown as adjustable elements in the diagram of Fig. 1. However, it should be understood that the values of these elements are not changed once the coupling circuit is properly adjusted, and only the values of capacitors 22 and 30 are changed to tune the coupling circuit over the desired band. For this reason circuits of the type shown in Fig. 1 may be constructed having fixed capacitors in place of adjustable capacitors 34, 36 and 38. In some instances it may be desirable to provide a limited range of adjustment in order to provide a convenient means for compensating for unavoidable variations in circuit constants normally encountered in the mass production of components.

Figure 2:
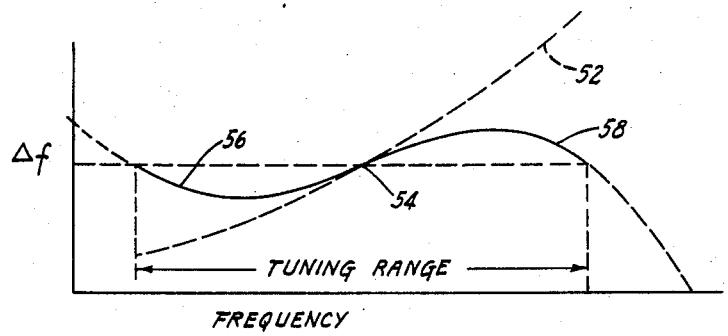
Fig. 2 is a plot of the bandwidth of the circuit of Fig. 1 as a function of frequency.

The graph of Fig. 2 illustrates in a general way the adjustments in the bandwidth which are possible with the circuits of Fig. 1. The graph of Fig. 2 assumes that the end circuits are critically loaded at all frequencies within the tunable range. It is relatively easy to achieve critical loading since the critical loading for a constant bandwidth circuit is a linear function of the frequency. In Fig. 2 curve 52 represents the variation in bandwidth with frequency which could be expected with only inductive coupling between inductors 20 and 28. This curve may be moved in the vertical direction by adjusting the mutual couplings M and M'. These mutual couplings are adjusted to place point 54 on curve 52 at the desired bandwidth for mid-frequency. Placing link 40 in the circuit causes the lower frequency end of the curve 52 to be raised as shown at 56, so that the bandwidth at the lower frequency end of the tuning range is again equal to that at point 54. In fact, curve 56 continues to rise below the tunable range as the resonant frequency of link 40 is approached. If the tunable range extends from say 500 to 1,000 megacycles, the resonant frequency below the tunable band should be at approximately 300 megacycles. Capacitors 34 and 38 cause the upper end of the curve 52 to be depressed as shown at 58. As shown in Fig. 2, the bandwidth does not remain exactly constant over the entire tuning range, but the deviation from the desired value may be made small by proper selection of the circuit constants. The maximum deviation shown in Fig. 1 may be further reduced by causing curves 56 and 58 to cross the horizontal broken line representing the desired bandwidth at points slightly inside the limits of the tunable range. Preferably the resonance above the tunable band should occur at approximately 1,600 megacycles.

It is possible, although usually less desirable, to cause the bandwidth to increase as a function of the frequency to which the end circuits are tuned. Obviously the circuit of Fig. 1 can be adjusted to cause this increase to be a function different from that resulting from straight inductance coupling. The two ends of the curve representing this variation may be shaped separately in the manner mentioned above.

Figure 3:
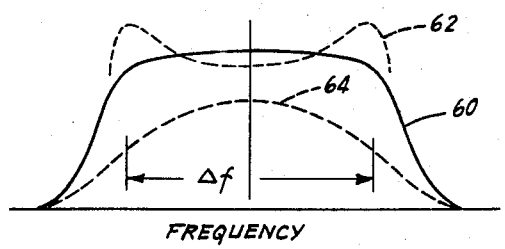
Fig. 3 is a plot showing the shape of the passband of the circuit of Fig. 1 for various conditions of loading.

If the end circuits are critically loaded, the passband will have the ideal flat-topped shape shown at 60 in Fig. 3. If the loading is less than critical, the passband curve will taken on the doubled hump shape shown at 62 and, if the loading is greater than critical, the passband curve will have a lower amplitude and a curved top as shown at 64. It is well known that the passband $\Delta f$ can be obtained with other values of coupling and loading and with a passband curve similar to curve 60 except that the maximum amplitude of the curve will be lower. A lower amplitude of curve 60 means less over-all gain for the coupled stages. Therefore, in designing a circuit in accordance with the present invention, the values of critical coupling and loading to give the maximum flat-topped response for the selected bandwidth are computed, and the mutual inductances M and M' of Fig. 1 are adjusted to provide this critical coupling. As explained above, the coupling network of the present invention will maintain the coupling necessary to provide this ideal response curve over the entire tunable range.

The control grid of tube 24 of the circuit of Fig. 1 may be connected to a coil or other form of input circuit which is supplied with a signal from another amplifier stage or from an antenna. Similarly the signal at the anode of tube 32 may be supplied to another amplifier stage or to a heterodyne converter. The bandpass characteristic of the interstage coupling network of Fig. 1 will block interfering signals from stations in adjacent channels or from other sources that would normally pass through a wideband amplifier stage.

Figure 4:
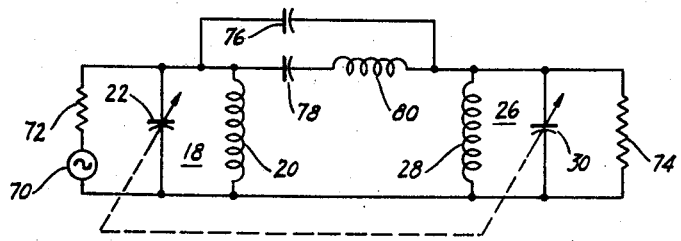
Fig. 4 is a schematic diagram of a second preferred embodiment of the invention.

Fig. 4 illustrates a second preferred form of the invention. In the circuit of Fig. 4, the two paths mentioned above are clearly shown. End circuits 18 and 26 correspond to similarly numbered elements in Fig. 1. Tube 24 or its equivalent is schematically represented in Fig. 4 by a signal source 70 in series with a source impedance 72. Similarly tube 32 is schematically represented by a load impedance 74 in shunt with end circuit 26. In Fig. 4 the capacitive path is provided by capacitor 76. The second path is provided by capacitor 78 and inductor 80. There is substantially no mutual inductance between coils 20 and 28. The values of capacitor 78 and inductor 80 are chosen so that the impedance of the second path remains inductive over the tunable range. It can be seen that, if this second path approaches series resonance at the lower end of the tunable range, the coupling through the second path will be greater than that provided by a single inductor. Similarly, if the parallel combination of the first path and the second path approach resonance at the upper end of the tunable range, the coupling impedance will be greater than the impedance of a single inductor and the amount of coupling will be correspondingly less. Therefore the response characteristic of the circuit of Fig. 4 will be similar to curve 56—58 of Fig. 2.

Figure 5:
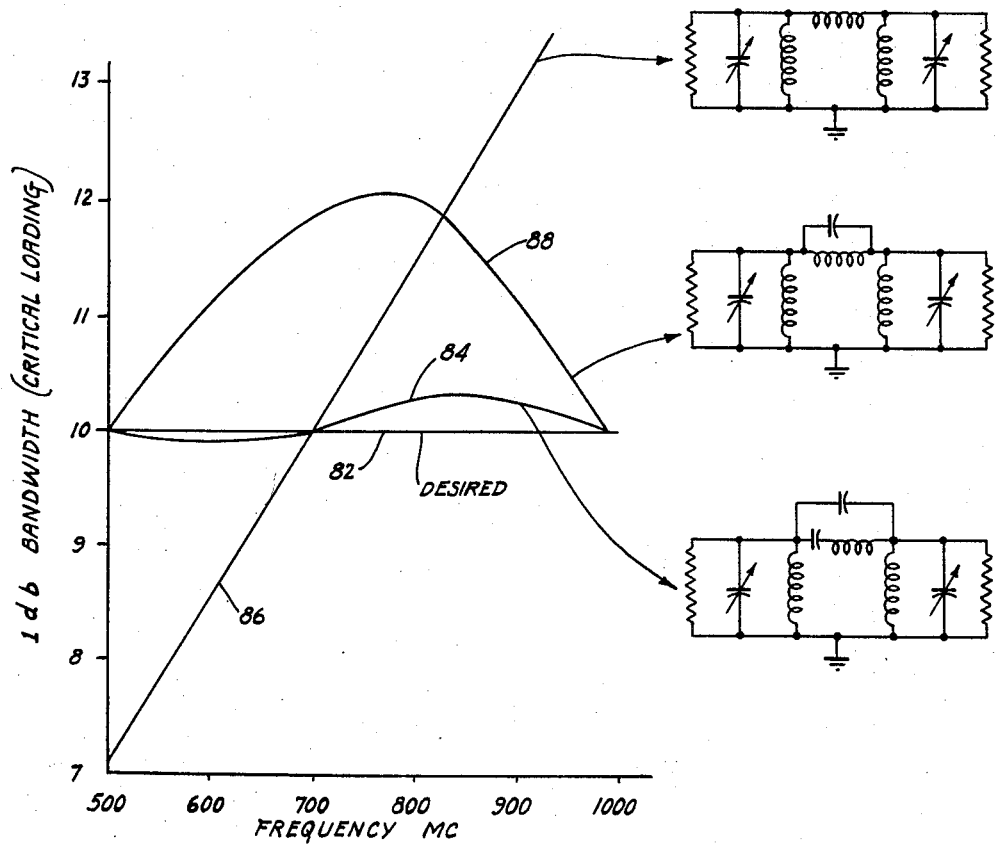
Fig. 5 is a plot of bandwidth against frequency for three different types of circuits, one of which is the embodiment of Fig. 4.

Fig. 5 is a series of curves which show the improvement afforded by the present invention over known types of circuits. The coordinates of Fig. 5 are the same as those of Fig. 2. The horizontal line 82 in Fig. 5 shows the ideal or desired constant bandwidth. Curve 84 shows the nearly ideal characteristic obtained with the circuit of Fig. 4. The line 86 illustrates the variation in bandwidth normally encountered with only inductive coupling between the two end circuits, and curve 88 shows the effect of supplementing the inductive coupling with capacitive coupling.

Figs. 6 through 9 show other embodiments of the present invention. It will be noted that each of these embodiments includes a capacitive path 90, and a second path 92, between end circuits 18 and 26. The second path 92 includes both inductance and capacitance, but has a net inductive reactance over the tunable range of the end circuits. All of these circuits exhibit a characteristic curve similar to curve 84 of Fig. 5.

Figure 6:
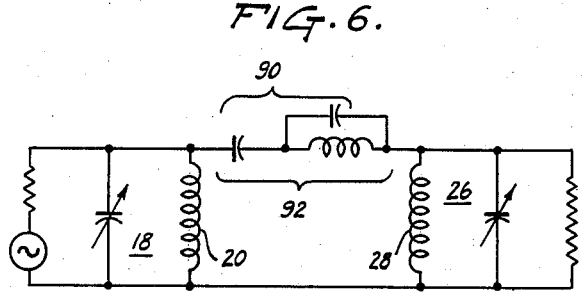
Figs. 6, 7, 8 and 9 are schematic diagrams of still other embodiments of the present invention.

The embodiment of Fig. 6 is similar to the one shown in Fig. 4 except that a portion of the capacitive path 90 is in common to the second path 92.

Figure 7:
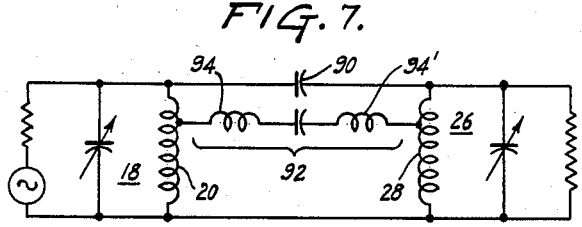

In Fig. 7 the inductor 80 of Fig. 4 has been split in two parts 94 and 94', and path 92 is connected between intermediate taps on inductors 20 and 28.

Figure 8:
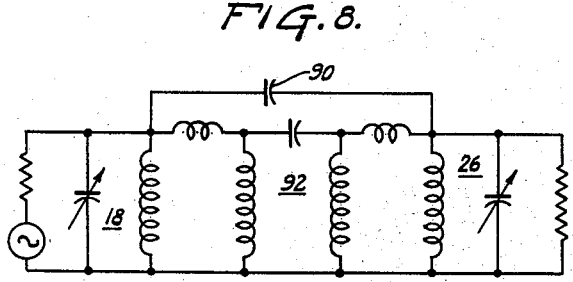

In Fig. 8 the T networks, formed by inductors 20 and 94 and by inductors 28 and 94' in Fig. 7, have been replaced by equivalent $\pi$ networks. No mutual coupling is employed in the embodiments shown in Figs. 6, 7 and 8.

Figure 9:
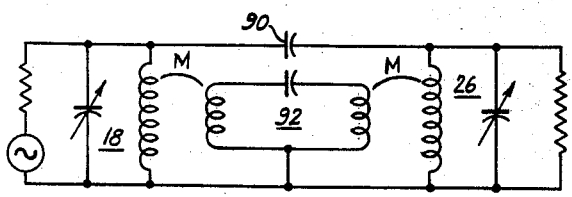

The embodiment of Fig. 9 is similar to the embodiment of Fig. 1 except that a separate capacitive path 90 is provided.

Figure 10:
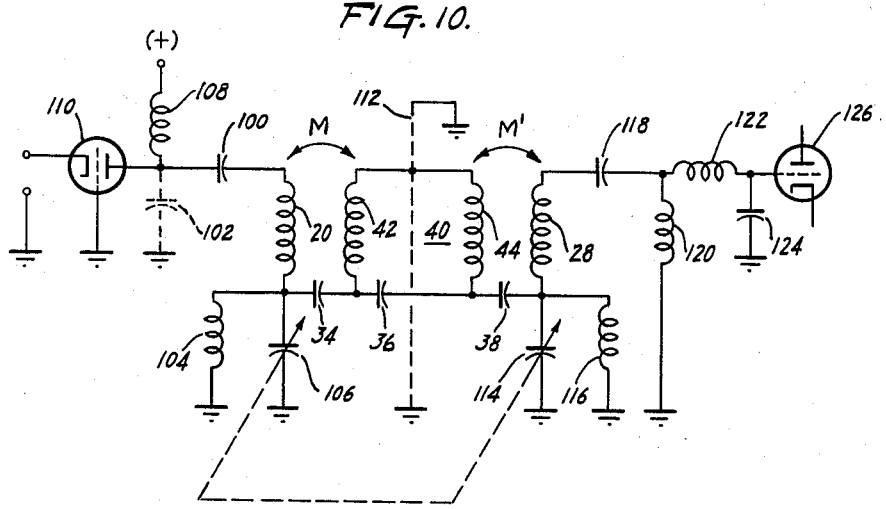
Fig. 10 is a schematic diagram of an embodiment of the invention which employs range extension of the tuning capacitors.

Fig. 10 shows still another embodiment of the invention which employs "range extension" of the tuning capacitors. It will be noted that the circuit of Fig. 10 is similar to the circuit of Fig. 1 in many respects. Therefore corresponding parts in these two figures have been given the same reference numerals. Capacitor 100 in Fig. 10 serves as a D.C. blocking capacitor in the circuit of Fig. 10. Capacitance 102 is the output capacitance of vacuum tube 110. This capacitance 102 is in shunt with inductor 20. The circuit including inductor 20 and capacitance 102 is tuned to parallel resonance by means of the parallel combination of inductor 104 and variable capacitor 106. Inductor 104 is a range extension inductor. In circuits operating in the ultrahigh frequency range, the minimum practical values of inductor 20 and capacitance 102 may be large. Tuning capacitor 106 must have a large reactance to tune the circuit to a high frequency, but it must have a small reactance to tune the end circuit to a low frequency. It has been found that it is practically impossible to obtain a tuning capacitor which will tune a combined UHF–VHF circuit of the type shown in Fig. 10 over the UHF band assigned to television. This is due primarily to the fact that the switching circuits employed to accomplish the conversion from UHF to VHF increase the size of capacitance 102. Placing inductor 104 in shunt with capacitor 106 reduces the minimum effective capacitance of capacitor 106 by a factor $$\frac{X_L - X_C}{X_L}$$

where $X_L$ is the inductive reactance of inductor 104 and $X_C$ is the capacitive reactance of capacitor 106. $X_C$ is to be taken as positive in the expression given above. Since $X_L$ is selected to be greater than $X_C$ for the entire tuning range, it will be seen that the factor given above is always less than unity but will approach a value of unity as $X_C$ becomes smaller, that is, as the tuning capacitor is adjusted to have a larger value of capacitance. Thus range extension inductor 104 makes it possible to tune the end circuit to higher frequencies than could be reached without this inductor. This increased range is obtained at the expense of a slight upward shift of the lower tuning limit which can be compensated for by a suitable increase in the maximum value of the tuning capacitor.

Choke 108 of Fig. 10 provides means for supplying an appropriate D.C. potential from the source represented by the plus sign (+) to the anode of tube 110. Tube 110 is connected as a grounded-grid amplifier. Link 40 is identical to link 40 of Fig. 1 except for the addition of a grounded shield 112 which prevents mutual coupling between inductors 42 and 44.

The second end circuit is similar to the one just described. Tuning capacitor 114 is ganged to capacitor 106. Capacitor 114 is shunted by a range extension inductor 116 which serves the same function as inductor 104. Capacitor 118 and inductor 120 are required to place the resonant frequency of the second end circuit in the proper range. Inductor 122 represents lead inductance, and capacitor 124 represents the input capacitance of tube 126.

Figure 11:
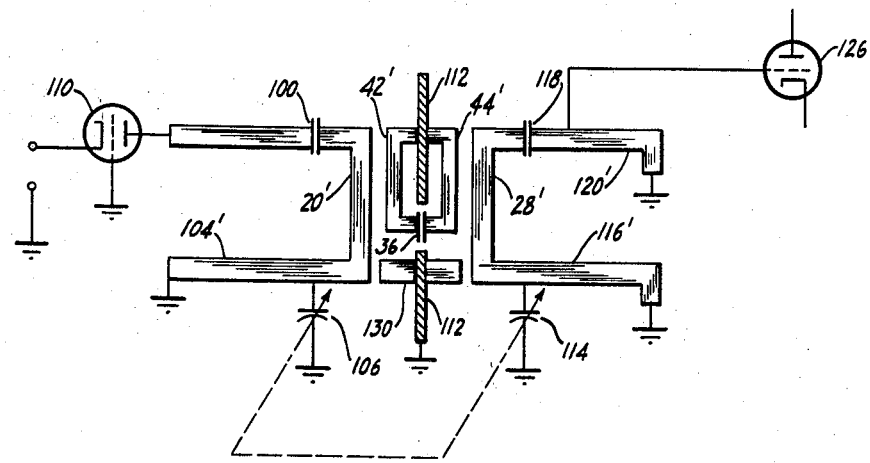
Fig. 11 is a view of an embodiment of the invention arranged for operation in the UHF band assigned to television broadcasting.

Fig. 11 is a representation of the circuit of Fig. 10 showing the form the various circuit elements might assume in a circuit designed for operation in the UHF band assigned to television broadcasting. Parts in Fig. 11, corresponding to like parts in Fig. 10, have been given the same reference numerals. Capacitors 36, 100, 106, 114 and 118 are actual physical capacitors. However, inductance 20 is in the form of a C-shaped copper strap 20′ extending from capacitor 100 to capacitor 106. Strap 104′ from capacitor 106 to ground forms the range extension inductor 104 of Fig. 10. C-shaped straps 28′, 42′ and 44′ form inductors 28, 42, and 44 respectively. Conductive strap 116′ from capacitor 114 to ground forms the second range extension inductor 116. Similarly strap 120′ forms inductor 120. The equivalent of capacitors 34 and 38 is provided by a conductive tab 130 extending through shield 112 to points adjacent C-shaped straps 20′ and 28′ respectively. The capacitive coupling from inductor 20 to inductor 28 may be altered by deforming tab 130. Shield 112 is formed with an opening therein to receive capacitor 36.

It has been found that the bandwidth of a circuit similar to the one shown in Fig. 11, but not including capacitor 36, varied from about 7 to 13 megacycles as the end circuits were tuned over the range from 500 to 800 megacycles. It was also noted that the use of range extension inductors 104′ and 116′ tended to cause an increase in the bandwidth variation. However, with the inclusion of capacitor 36 in accordance with the teachings of the present invention, the bandwidth varied only between the values of 12 and 14 megacycles for a frequency variation of from 400 to 1,000 megacycles.

The circuit shown in Fig. 11 may be modified to function as a passive selective circuit between an antenna and a mixer. This may be accomplished by omitting tube 110 and grounding the point of the circuit connected to the anode of tube 110. A single turn loop connected across the antenna terminals, and inductively linked to strap 20′, may be employed to inject the received signal into the coupling circuit. Tube 126 may be replaced by a crystal mixer which receives a local oscillator signal in a conventional manner. The other circuits shown may be employed in a similar manner.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A coupling circuit comprising first and second similar synchronously tunable end circuits and a coupling network connecting said two end circuits, said coupling network providing two signal paths, one of said paths being solely capacitive and the other of said paths exhibiting the characteristic of a series combination of inductors and capacitors, said last-mentioned path exhibiting a series resonance effect at a frequency lower than the lowest frequency to which said end circuits are to be tuned, and said two paths in combination exhibiting a parallel resonance effect at a frequency higher than the highest frequency to which the circuit is to be tuned, the net inductive reactance of said two paths, at a frequency approximately midway between the two extremities to which said end circuits are to be tuned, being approximately equal to that of a single inductor connecting said two end circuits which would give critical coupling, said solely capacitive path extending directly from a point on said first end circuit at a signal potential other than reference potential to a corresponding point on said second end circuit, said other path extending directly from a selected region of one end circuit to a corresponding region of the other end circuit.

2. A selective coupling circuit comprising first and second synchronously tunable end circuits and a coupling network connecting said two end circuits, said coupling network comprising a first inductor mutually coupled to said first end circuit and a second inductor mutually coupled to said second end circuit, a first end of said first inductor being connected to a first end of said second inductor, a first capacitor connecting a second end of said first inductor to a second end of said second inductor, a second capacitor connecting said second end of said first inductor to said first end circuit and a third capacitor connecting the second end of said second inductor to said second end circuit.

3. A coupling circuit for connecting the anode of a first vacuum tube to the control grid of a second vacuum tube, said coupling circuit comprising a first inductor having one terminal coupled to the anode of said first vacuum tube, a tuning capacitor connected from a second terminal of said first inductor to a point of reference potential, a second inductor connected in shunt with said first tuning capacitor, said second inductor and said first tuning capacitor forming a first parallel circuit which exhibits an inductive reactance over the tunable range of said coupling circuit, the combination of said first inductor and said first parallel circuit being tunable to resonate with the output capacitance of said first vacuum tube within a selected frequency band, a third inductor having a first end thereof coupled to the control grid of said second vacuum tube, a second tuning capacitor connected between a second end of said third inductor and a point of reference potential, a fourth inductor connected in shunt with said second tuning capacitor, the parallel combination of said fourth inductor and said second tuning capacitor exhibiting inductive reactance over the tunable range of said coupling circuit, the combination of said third inductor and the parallel combination of said second tuning capacitor and said fourth inductor being tunable to resonate with the effective input capacitance of said second vacuum tube within said selected frequency band, a fifth inductor mutually coupled to said first inductor, a sixth inductor mutually coupled to said third inductor, said fifth and sixth inductors each having one terminal thereof connected to a point of fixed reference potential, a third capacitor connecting a second terminal of said fifth inductor to a second terminal of said sixth inductor, a fourth capacitor connecting a second terminal of said first inductor to said second terminal of said fifth inductor and a fifth capacitor connecting a second terminal of said third inductor to said second terminal of said sixth inductor.

4. A selective coupling circuit comprising first and second synchronously tunable end circuits, each of said end circuits comprising a shunt combination of capacitive impedance means and inductive impedance means, said shunt combination forming a closed path through which circulates relatively high amplitude currents at the resonant frequency of said end circuits, and a coupling network connecting said two end circuits, the components of said coupling network being distinct from the components of said end circuits, said coupling network comprising a first inductor mutually coupled to said inductive impedance means of said first end circuit, and a second inductor mutually coupled to said inductive impedance means of said second end circuit, a first end of said first inductor being connected to a first end of said second inductor, a first capacitor connecting a second end of said first inductor to a second end of said second inductor, a second capacitor connecting said second end of said first inductor to said first end circuit and a third capacitor connecting the second end of said second inductor to said second end circuit.

5. A selective coupling circuit comprising a first inductor having first and second terminals, a first tuning capacitor connected from said second terminal of said first inductor to a point of reference potential, a second inductor connected in shunt with said first tuning capacitor, said second inductor and said first tuning capacitor forming a first parallel circuit which exhibits an inductive reactance over the tunable range of said coupling circuits, a first capacitive impedance connected between said first terminal of said first inductor and said point of reference potential, the combination of said first inductor and said first parallel circuit being tunable to resonate with said first capacitive impedance means within a selected frequency band, a third inductor having first and second end terminals, a second tuning capacitor connected between said second end of said third inductor and said point of reference potential, a fourth inductor connected in shunt with said second tuning capacitor, the parallel combination of said fourth inductor and said second tuning capacitor exhibiting inductive reactance over the tunable range of said coupling circuit, a second capacitive impedance connected from the first terminal of said third inductor to said point of reference potential, the combination of said third inductor and the parallel combination of said second tuning capacitor and said fourth inductor being tunable to resonate with said second capacitive impedance within said selected frequency band, a fifth inductor mutually coupled to said first inductor, a sixth inductor mutually coupled to said third inductor, said fifth and sixth inductors each having one terminal thereof connected to said point of fixed reference potential, a third capacitive impedance connecting a second terminal of said fifth inductor to a second terminal of said sixth inductor, a fourth capacitive impedance connecting said second terminal of said first inductor to said second terminal of said fifth inductor and a fifth capacitive impedance connecting a second terminal of said third inductor to said second terminal of said sixth inductor.

6. A selective coupling circuit comprising a first capacitive impedance and a first inductive impedance connected in shunt combination to form a first end circuit, means for varying the reactance of one of said two means forming said first end circuit, the last-mentioned means being such as to permit the resonant frequency of said end circuit to be tunable over a selected frequency band, a second inductive impedance and a second capacitive impedance connected in shunt combination to form a second end circuit, means for varying the reactance of one of said means in said second end circuit in synchronism with the variation in the reactance of said means of said first end circuit thereby to tune the resonant frequency of said second end circuit over said selected frequency band in synchronism with the tuning of said first end circuit, a first inductor mutually coupled to said inductive impedance means of said first end circuit, said first inductor having one end thereof connected to a point of fixed reference potential, a second inductor having one end terminal connected to said point of fixed reference potential, said second inductor being mutually coupled to said inductive impedance means of said second end circuit, a first capacitor connecting a second terminal of said first inductor to a second terminal of said second inductor, a second capacitor connecting said second terminal of said first inductor to one terminal of said inductive impedance means of said first end circuit and a third capacitor connecting said second end terminal of said second inductor to one terminal of said inductive impedance means of said second end circuit, the combination including said first and second inductors and said first, second and third capacitors exhibiting a series resonant effect at a frequency equal to approximately 0.6 that of the lowest frequency of said selected band and said combination of said first and second inductors and said first, second and third capacitors exhibiting a parallel resonance effect at a frequency approximately 1.6 that of the highest frequency of said band, the net inductive reactance of the combination comprising said first and second inductors and said first, second and third capacitors at a frequency approximately midway between the two extremities of said selected band being approximately equal to that of a single inductor connecting said two end circuits which would give critical coupling.

References Cited in the file of this patent

UNITED STATES PATENTS

| | | |
|---|---|---|
| 2,052,338 | Budenbom | Aug. 25, 1936 |
| 2,161,593 | Rust | June 6, 1939 |
| 2,187,805 | Landon | Jan. 23, 1940 |
| 2,244,022 | Rust et al. | June 3, 1941 |
| 2,336,498 | Minter | Dec. 14, 1943 |
| 2,661,459 | Schmidt | Dec. 1, 1953 |

OTHER REFERENCES

Terman: Radio Engineering, 3rd edition, published by McGraw-Hill Book Co., Inc., New York and London, in 1947, pages 58–69. (Copy in Scientific Library.)